UNITED STATES PATENT OFFICE.

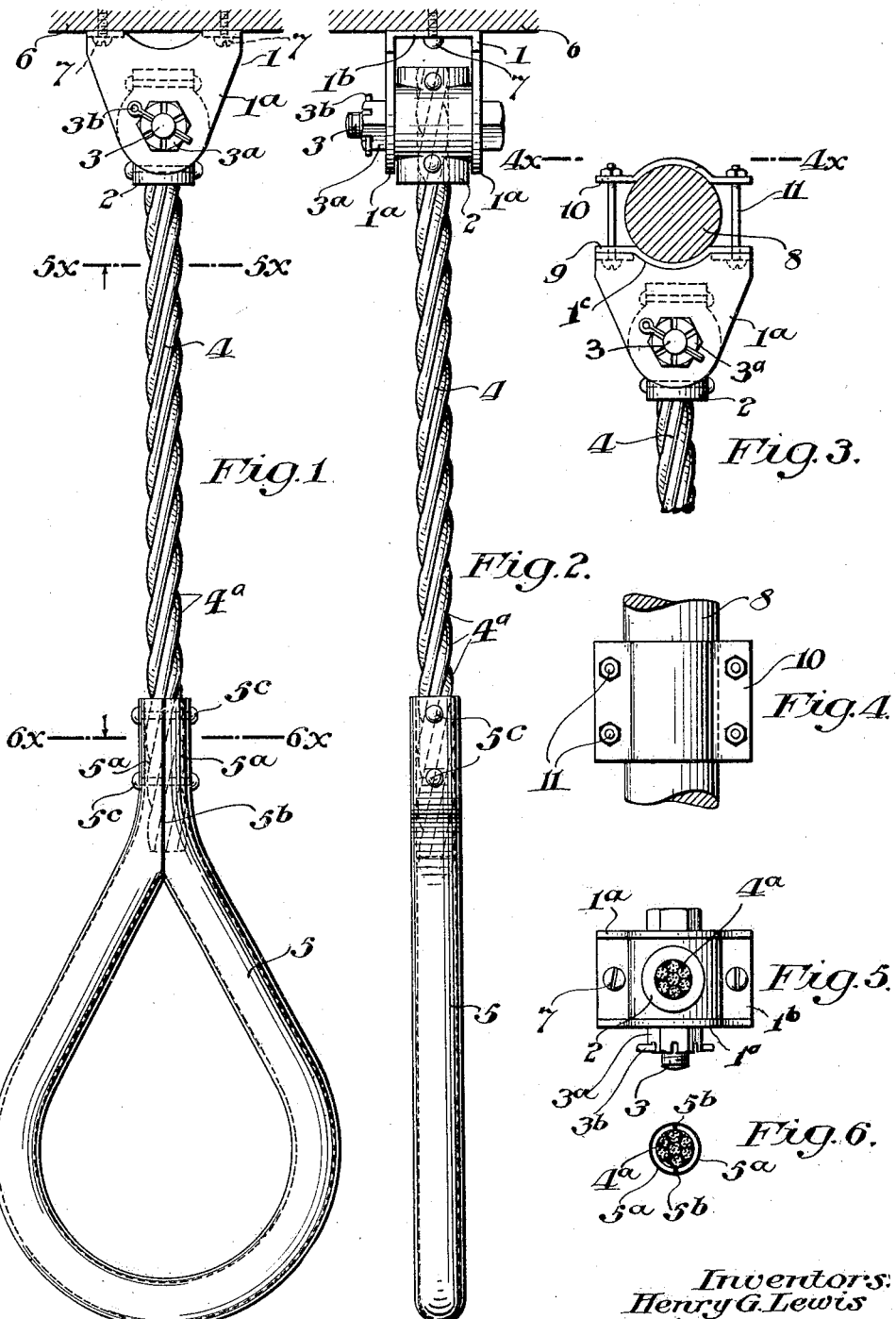

HENRY G. LEWIS AND WALTER S. MAYER, OF PHILADELPHIA, PENNSYLVANIA, ASSIGNORS TO ELECTRIC SERVICE SUPPLIES COMPANY, OF PHILADELPHIA, PENNSYLVANIA, A CORPORATION OF PENNSYLVANIA.

HANDHOLD-HANGER.

1,373,746.  Specification of Letters Patent.  Patented Apr. 5, 1921.

Application filed February 2, 1920. Serial No. 355,750.

*To all whom it may concern:*

Be it known that we, HENRY G. LEWIS and WALTER S. MAYER, citizens of the United States, and residents of the city of Philadelphia, in the county of Philadelphia and State of Pennsylvania, have jointly invented certain Improvements in Handhold-Hangers, of which the following is a specification.

This invention is a hand hold hanger, or "hanger strap," adapted for use in street and other cars, and its primary object is to furnish a simple, strong and convenient construction adapted for adjustment and application to supports of various characters and having an inherent resistance to oscillation, a desired resiliency and an inherent capacity for assuming its normal position.

In the accompanying drawings, Figure 1 is a side elevation of the hanger embodying our improvements applied to a support having a plane horizontal surface; Fig. 2 is a view of the same at right angles to the position shown in Fig. 1; Fig. 3 is a broken part sectional view of the hanger applied to a rod; Fig. 4 is a sectional view taken on the line $4^x$—$4^x$ of Fig. 3; Fig. 5 is a sectional view on the line $5^x$—$5^x$ of Fig. 1 and Fig. 6 is a sectional view on the line $6^x$—$6^x$ of Fig. 1.

The hanger embodying our invention, as illustrated in the drawings, comprises a bearing 1, a knuckle 2, a bolt 3 connecting the knuckle with the bearing, a steel cable 4 having an end fixed to the knuckle and a hand hold-loop 5 fixed to the other end of the cable.

In the preferred construction, the bearing 1 is formed up from sheet metal with the parallel lugs or wings $1^a$ connected by the webs $1^b$ and having the depressed concave seat $1^c$.

This bearing 1 is adapted for connection with a plain surface support 6 by screws 7, or with a curved surface support as the rod 8, to which it is fixed through a shim 9 (conforming thereto and to the rod) and a clamp 10 by bolts 11.

A knuckle 2 is of metal cast on the top of the cable 4 so that the two are knit together firmly, the cable comprising the spirally twisted steel strands $4^a$ preferably formed spirally of twisted threads. But the knuckle may be bored and the cable riveted therein. The bolt 3 extends through the lugs or wings $1^a$ and the knuckle 2 transversely to the normal position of the cable 4, the bolt being drawn up by the nut $3^a$ and held by a key $3^b$ so as to clamp the wings against the knuckle to hold it in any desired angular position with relation to the bearing. By loosening the nut $3^a$ the bearing 1 can be adjusted, relatively to the knuckle 2 and the cable 4 when in the desired vertical position, so that the bearing can be applied to any surface between the horizontal and vertical or the web disposed in any angular position with respect to the horizontal.

The hand hold or loop 5 is formed from a section of metal tubing cut to the proper length and having its ends shorn longitudinally to provide the complementary sections $5^a$ adapted to engage along the plane $5^b$ approximately in the axis of the cable and joined on the lower end of the cable 4, to which they are fixed by the rivets $5^c$ by brazing or both.

Having described our invention, we claim:

1. The combination with a bearing, of a resilient metal tension member supported by said bearing so as to restrain oscillatory movement thereof, and a tubular hand hold supported by said member.

2. The combination with a bearing, of a resilient steel cable having spiral strands held against longitudinal movement by said bearing and a hand hold supported by said cable.

3. The combination with a bearing having a pair of lugs, a knuckle disposed between said lugs, a bolt extending through said knuckle and lugs, a resilient metal cable fixed to said knuckle, and a hand hold fixed to said cable.

4. The combination with a bearing, of a cast metal knuckle engaged to said bearing, a resilient steel cable having an end thereof cast in said knuckle, and a hand hold fixed on the other end of said cable.

5. The combination of a bearing having wings and a web connecting them, a knuckle disposed between said wings, a bolt for clamping said knuckle and wings together in relatively adjustable relation, a resilient steel cable having an end thereof fixed in said knuckle, and a hand hold fixed to the other end of said cable.

6. The combination of a bearing having wings connected by a web provided with a depressed seat transverse to said wings, a knuckle disposed between said wings, a bolt extending through said knuckle and wings whereby they are clamped together in relatively adjustable relation, means coacting with said web for clamping said bearing to a support, a resilient steel cable having an end fixed in said knuckle, and a hand hold fixed on the other end of said cable.

7. The combination of a bearing, a flexible metal tension member supported by said bearing, and a tubular hand hold supported by said member, said hand hold having complementary end sections fitted together on and fixed to said member.

8. The combination of a bearing, a flexible tension member supported by said bearing and a coated tubular metal hand hold supported by said member, said hand hold having complementary ends with juxtaposed longitudinal edges joined on said member in a plane extending longitudinally thereof.

In testimony whereof we have hereunto set our names and seals, this 27th day of January, 1920.

HENRY G. LEWIS.
WALTER S. MAYER.